C. L. TEEVAN.
ARMOR OR REINFORCEMENT.
APPLICATION FILED MAY 11, 1917.
1,251,444.
Patented Dec. 25, 1917.
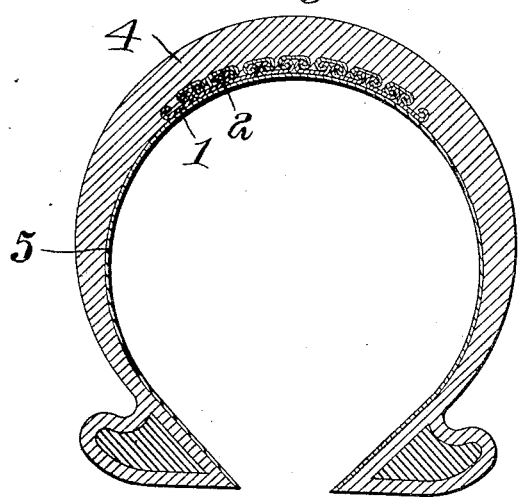
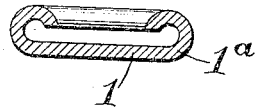
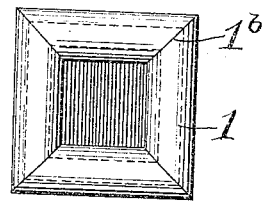
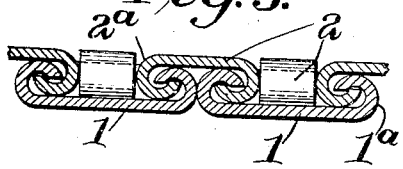
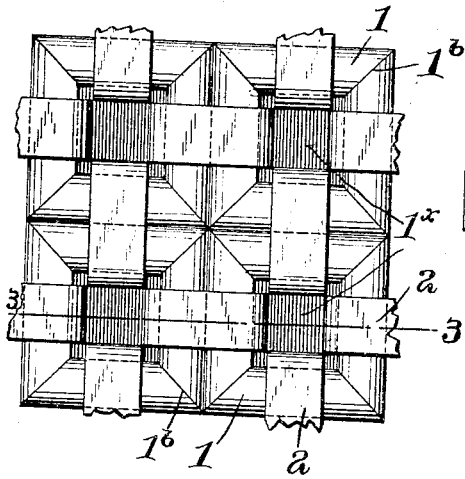
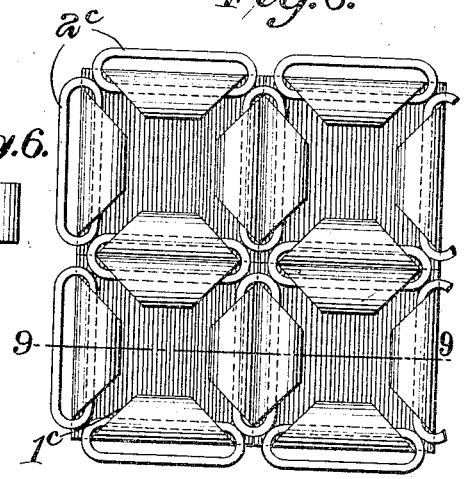
Inventor:
Charles L. Teevan,
Spear Middleton Donaldson
Atty's.

UNITED STATES PATENT OFFICE.

CHARLES L. TEEVAN, OF BROOKLYN, NEW YORK.

ARMOR OR REINFORCEMENT.

1,251,444.   Specification of Letters Patent.   Patented Dec. 25, 1917.

Application filed May 11, 1917. Serial No. 167,967.

*To all whom it may concern:*

Be it known that I, CHARLES L. TEEVAN, a citizen of the United States, and resident of the borough of Brooklyn, State of New York, have invented certain new and useful Improvements in Armors or Reinforcements, of which the following is a specification.

My present invention relates to improvements in armors or reinforcements designed more especially as means for preventing punctures and blow-outs in pneumatic tires and comprises a novel form of reinforcement or armor of extreme flexibility and made up of separate units detachably connected, whereby the armor may be built up for different size tires by simply using a greater or lesser number of units. The invention also includes an armor fabric made up of such units so shaped and combined as to present a comparatively smooth surface on the inner concave side, or side toward the inner tube, while the outer or convex side is provided with a plurality of pockets into which the rubber of the body can project and with which it will be interlocked.

My invention is illustrated in the accompanying drawings, in which,

Figure 1 is a transverse sectional view of a tire embodying my invention.

Fig. 2 is a top plan view of a portion of the reinforcement on a much larger scale.

Fig. 3 is a section on line 3—3 of Fig. 2.

Fig. 4 is a top plan view of one of the elements.

Fig. 5 is a transverse sectional view of the same.

Fig. 6 is a top plan view of one of the other elements, and

Fig. 7 is an edge view of the same.

Fig. 8 is a plan view of a modified form, and

Fig. 9 is a section on line 9—9 of Fig. 8.

Referring more particularly to these drawings, my improved flexible reinforcement or armor is made up of a plurality of link plates 1 adapted to line the tread portion of the tire and a plurality of connecting elements or links 2 adapted to tie the said link plates together both transversely and longitudinally.

The link plates 1 are preferably made of square shape as shown and are provided with flat under surfaces which, when the plates are united, form an approximately smooth surface.

These link plates have overturned edges $1^a$ on all four sides forming curved flanges which are mitered at the ends so as to meet on the line $1^b$. The links 2 are formed with curved ends $2^a$ and are of such length that these curved ends are designed to hook over the flanges $1^a$ of the link plates 1.

It will be seen that a plurality of link plates may be secured together by the links by the simple engagement of the interengaging flanges to produce an armor of the requisite width and of any desired length and of endless form, and when in place in relation to the tire the link elements will, of course, be prevented from separating. The armor so formed will be flexible both longitudinally and transversely and will effectually prevent puncturing or injury to the tire.

The link elements may be readily stamped or formed up from sheet metal.

When in place as a reinforcement or armor the rubber composition of the tire 4 will project into the recesses $1^x$ formed by the open centers of the link plates and be vulcanized into interlocking relation thereto, as shown in Fig. 1. In this figure the body of the tire is shown conventionally, and is intended to be representative of any ordinary or desired form of tire built up of fabric and rubber. The inner surface of the armor or reinforcement is preferably faced by a layer of rubberized fabric 5.

In the form shown in Figs. 8 and 9 I separate the mitered corners as indicated at $1^c$ and connect the link plates by links $2^c$ of plain loop shape.

While in Fig. 1 I have shown the armor as coextensive with the tread portion of the tire only it will be obvious that it may be continued down the sides of the tire to any desired degree.

What I claim is:

1. A reinforcement or armor comprising a plurality of substantially rectangular link plates having all four sides overturned to form hooked edges, spaced from each other to form pockets, and a plurality of members having hooked ends engaging the hooked edges of adjacent plates for tying the same together.

2. A tire having an armor incorporated therein comprising a series of plates having abutting edges flexibly connected, said plates having smooth inner faces and pockets in their outer faces, the rubber of the tire projecting into and interlocking with said pockets, and a layer of rubberized fabric applied directly to the inner surface of the armor and forming a contact surface for the inner tube.

In testimony whereof, I affix my signature.

CHARLES L. TEEVAN.

Witnesses:
WENDELL P. McKOWN,
LEON CAMMEY.